US004001725B2

United States Statutory Invention Registration [19]

[11] Reg. Number: H1725

[45] Published: May 5, 1998

Modic et al.

[54] CLEAR POLYPHENYLENE ETHER/BLOCK COPOLYMER COMPOSITION

[75] Inventors: Michael John Modic, Houston, Tex.; Ronald Wroczynski, Schenectady, N.Y.; James Scobbo, Slingerlands, N.Y.; Gim Lee, Albany, N.Y.

[73] Assignee: Shell Oil Company, Houston, Tex.

[21] Appl. No.: 606,181

[22] Filed: Feb. 23, 1996

[51] Int. Cl.[6] ..... C09K 3/00

[52] U.S. Cl. ..... 252/1

[58] Field of Search ..... 525/90, 92 R, 525/88; 252/399

[56] References Cited

U.S. PATENT DOCUMENTS

| | | | |
|---|---|---|---|
| H1387 | 12/1994 | Hansen et al. | 525/92 |
| Re. 27,145 | 6/1971 | Jones | 260/880 |
| 3,231,635 | 1/1966 | Holden et al. | 260/880 |
| 3,494,942 | 2/1970 | Miki et al. | 260/397.5 |
| 3,634,549 | 1/1972 | Shaw et al. | 260/880 B |
| 3,670,054 | 6/1972 | De La Mare et al. | 260/880 B |
| 3,700,633 | 10/1972 | Wald et al. | 260/880 B |
| 3,952,072 | 4/1976 | Yonemitsu et al. | 260/874 |
| 4,038,343 | 7/1977 | Yonemitsu et al. | 260/874 |
| 4,081,424 | 3/1978 | Gergen et al. . | |
| 4,184,999 | 1/1980 | Olander | 260/42.18 |
| 4,196,116 | 4/1980 | Haaf et al. . | |
| 4,277,575 | 7/1981 | Haaf et al. | 525/89 |
| 4,282,335 | 8/1981 | Sugio et al. | 525/68 |
| 4,309,514 | 1/1982 | Lee, Jr. | 525/92 |
| 4,315,086 | 2/1982 | Ueno et al. | 525/391 |
| 4,322,506 | 3/1982 | Rollmann | 525/92 |
| 4,322,507 | 3/1982 | Haaf | 525/92 |
| 4,341,879 | 7/1982 | Sugio et al. . | |
| 4,360,568 | 11/1982 | Allison, III | 428/411 |
| 4,684,681 | 8/1987 | Lee, Jr. et al. | 524/127 |
| 4,684,696 | 8/1987 | Bates et al. | 525/68 |
| 4,764,572 | 8/1988 | Bean, Jr. | 526/87 |
| 4,835,200 | 5/1989 | St. Clair | 524/100 |
| 5,182,151 | 1/1993 | Furuta et al. | 428/36.92 |
| 5,194,530 | 3/1993 | Stevens et al. | 526/82 |
| 5,229,464 | 7/1993 | Erickson et al. | 525/314 |
| 5,273,706 | 12/1993 | Laughner | 264/540 |

FOREIGN PATENT DOCUMENTS

| | | |
|---|---|---|
| 0 367 188 A | of 0000 | European Pat. Off. . |
| 0 409 657 A | 1/1991 | European Pat. Off. . |
| 0 611 802 A | 8/1994 | European Pat. Off. . |
| 03 086756 A | 4/1991 | Japan . |
| 83 01254 A | 4/1983 | WIPO . |

OTHER PUBLICATIONS

PCT Search Report dated 27 Jun. 1997.

*Primary Examiner*—Charles T. Jordan
*Assistant Examiner*—Meena Chelliah

[57] ABSTRACT

A clear polyphenylene ether composition having improved impact strength comprising said polyphenylene ether and a block copolymer having a resinous block and a rubbery block wherein the resinous block is relatively high molecular weight and is derived from either styrene or butadiene with a resinous content of the block copolymer being within the range of 45 to 58 weight percent.

15 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CLEAR POLYPHENYLENE ETHER/BLOCK COPOLYMER COMPOSITION

BACKGROUND OF THE INVENTION

This invention relates to polyphenylene ether blend compositions.

Polyphenylene ethers (PPE) also known as polyphenylene oxide (PPO®) are naturally clear high melting thermoplastic engineering resins. Because of their high melting points the polymers by themselves are of limited utility. However, PPE is highly miscible in polystyrene and highly miscible in many high impact polystyrenes produced by rubber modification (HIPS). Such blends are lower melting and thus constitute the type of PPE compositions typically employed in commerce. While PPE is a high strength material, it has low impact strength as measured by notch sensitive tests such as notched Izod. The incorporation of high impact polystyrene improves impact strength but results in a loss of clarity.

Another class of polymers which can be blended with PPE resins is the block copolymers produced with alkali metal catalysts. This technology is well known in the art and allows the sequential polymerization of monomers such as vinylaromatics and conjugated dienes to give block copolymers having resinous and rubbery blocks. Through this technology, diblock polymers can be formed which are typically designated A-B. Also, triblock linear polymers which are generally designated A-B-A can be produced either by the sequential polymerization of the monovinylarene monomer followed by the conjugated diene monomer, followed by a second aliquot of monovinyl aromatic monomer or by the coupling of the A-B species with a difunctional coupling agent. Alternatively, polyfunctional coupling agents can be utilized to give a radial or star configuration. Generally, such polymers are defined in terms of their total monovinyl aromatic content since resinous products are produced from predominantly polymerized monovinyl aromatic component whereas rubbery materials result from predominantly conjugated diene compositions.

SUMMARY OF THE INVENTION

It is an object of this invention to provide clear, tough PPE compositions;

It is a further object of this invention to provide impact resistant compositions with a minimal sacrifice of clarity; and It is a further object of this invention to provide a process for producing clear impact resistant PPE compositions.

In accordance with this invention, there is provided a clear PPE composition containing 2 to 30 weight percent of a hydrogenated conjugated diene/monovinyl aromatic linear block copolymer, said copolymer having:

45–58 weight percent monovinyl aromatic content;

polymerized monovinyl aromatic blocks having a molecular weight within the range of 23,000–100,000;

polymerized conjugated diene blocks of less than 150,000 molecular weight; and a total molecular weight in the case of A-B polymers within the range of 40,000–225,000, and in the case of A-B-A polymers, 80,000–350,000.

DETAILED DESCRIPTION OF THE INVENTION

Surprisingly, it has been discovered that it is the molecular weight of the individual monovinyl arene blocks as well as the weight percent monovinyl arene content that is critical when the goal is to give clear impact resistant blends. For instance, two A-B polymers, one with a 15,000 molecular weight styrene block and a 15,000 molecular weight isoprene block and the other with a 40,000 molecular weight styrene block and a 40,000 molecular weight isoprene block would both have 50 weight percent styrene but only the second would be suitable for this invention because the first has such low molecular weight individual styrene blocks.

The PPE resins suitable for use in this invention are commercially available and are produced by techniques well known in the art such as by oxidizing a phenol with an oxygen-containing gas in the presence of a catalyst system comprising a cuprous salt and a tertiary amine. Suitable PPE resins are homo- and copolymers with repeating units of the formula

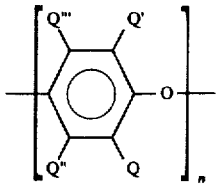

wherein Q, Q', Q'' and Q''', are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus, and Q', Q'' and Q''' in addition may be halogen with the proviso that Q and Q' are preferably free of any tertiary carbon atoms; and n represents the total number of monomer residues and is an integer of at least 50.

Especially preferred is poly(2,6-dimethyl-1,4-phenylene) ether.

The monovinyl aromatic/conjugated diene copolymers can be made by anionic polymerization with an alkali metal catalyst such as sec-butyllithium as disclosed for instance in Bean, Jr., U.S. Pat. No. 4,764,572 (Aug. 16, 1988), Holden et al, U.S. Pat. No. 3,231,635 Jan. (25, 1966,) Wald et al, U.S. Pat. No. 3,700,633 (Oct. 24, 1972, and Stevens et al, U.S. Pat. No. 5,194,530 (Mar. 16, 1993), the disclosures of which are hereby incorporated by reference.

The monovinyl aromatic monomer suitable for producing the resinous block of the block copolymers of this invention is styrene or α-methylstyrene, most preferably styrene.

The conjugated diene monomers suitable for producing the rubbery block of the block copolymers utilized in this invention are preferably conjugated alkadienes having 4 to 8 carbon atoms. Illustrative of such conjugated alkadienes are 1,3-butadiene (butadiene), 2-methyl-1,3-butadiene (isoprene), 1,3-pentadiene (piperylene), 1,3-octadiene, and 2-methyl-1,3-pentadiene. Preferred conjugated alkadienes are butadiene and isoprene, most preferably isoprene.

The block copolymers utilized in this invention are those which have been selectively hydrogenated to remove most of the ethylenic or vinyl unsaturation and to leave unaffected most of the aromatic unsaturation. Suitable known catalysts for accomplishing this include nickel compounds in combination with a reducing agent such as an aluminum alkyl. Hydrogenation is taught in U.S. Pat. Nos. 3,494,942, 3,634,549, 3,670,054, 3,700,633, and Reissue 27,145, the disclosures of which are hereby incorporated by reference. The hydrogenation is effective to remove a majority generally at least 90%, more generally at least 95% of the original unsaturation in the polymerized diene component and to remove no more than 50%, preferably no more than 25%, more preferably no more than 10% of the aromatic unsaturation in the polymerized monovinylarene component.

The block copolymers utilized in this invention have a weight percent polymerized monovinyl arene content within the range of 45 to 58.

The individual polymerized monovinyl arene blocks have a molecular weight within the range of 23,000–100,000, preferably a molecular weight within the range of 40,000–80,000.

The polymerized conjugated diene blocks have a molecular weight of less than 150,000.

The total molecular weight of the block copolymers is within the range of 40,000–225,000 for the A-B diblock polymers, preferably 60,000–160,000 and for the A-B-A polymers, the molecular weight is within the range of 80,000–350,000, preferably 100,000–275,000.

Molecular weights of linear polydienes are conveniently measured by Gel Permeation Chromatography (GPC), where the GPC system has been appropriately calibrated. Polymers of known molecular weight are used to calibrate and these must be of the same molecular structure and chemical composition as the unknown linear polymers or segments that are to be measured. For anionically polymerized linear polymers, the polymer is essentially monodispersed and it is both convenient and adequately descriptive to report the "peak" molecular weight of the narrow molecular weight distribution observed. As used herein, references to molecular weight mean "peak" molecular weight. These techniques are known in the art as disclosed for instance by Erickson et al, U.S. Pat. No. 5,229,464 (Jul. 20, 1993), the disclosure of which is hereby incorporated by reference.

The block copolymer is present in the compositions of this invention in an amount within the range of 2–30, preferably 5–25, more preferably 10–25 weight percent based on the weight of the copolymer and PPE component.

The PPE resin and the block copolymer can be combined by either melt blending or solution blending, but preferably are combined by melt blending.

Since the purpose of this invention is to provide a clear composition, the composition cannot contain any additional ingredients which would significantly impart haze. A small amount of polystyrene may be added to improve the processability of the blends. However, the polystyrene should not be added in an amount high enough to affect the haze properties (i.e. less than 10% weight). Preferably, if used, 2 to 5 weight percent based on the weight of the total composition is used. The compositions will, however, in almost all instances contain a small amount of stabilizer such as an antioxidant, so as to prevent degradation of the polymer. Such ingredients are generally present in an amount within the range of 0.01 to 2 weight percent, more generally 0.05 to 0.5 weight percent. Suitable stabilizers disclosed for instance in St. Clair, U.S. Pat. No. 4,835,200 (May 30, 1989), the disclosure of which is hereby incorporated by reference. One particularly suitable material is tetrakis-] methylene-(3,5-di-t-butyl-4-hydroxycinnamate)] methane sold under the tradename Irganox 1010 by Ciba Geigy. Other hindered phenols are also suitable.

When reference is made to clarity it is to be understood that the composition of the invention may have some slight haze imparted by the copolymer. However, the compositions are such that they have a visual appearance of clarity and preferably a luminous transmittance of at least 20% of that of the unmodified PPE.

Preferably, the compositions consist essentially of the PPE resin, the block copolymer, and the stabilizer with the stabilizer preferably being present in an amount within the range of 0.05 to 0.5 weight percent based on the weight of the PPE and block copolymer. Alternatively it consists essentially of these ingredients plus the polystyrene. Most preferably the compositions consist essentially of PPE, A-B block copolymer and antioxidant, again with the antioxidant being present in an amount within the range of 0.05 to 0.5 weight percent based on the weight of the polymeric ingredients.

The compositions of this invention are useful for consumer items such as lighting fixtures.

EXAMPLES

In the following examples, a styrene-isoprene A-B block copolymer was prepared utilizing an organolithium initiator in cyclohexane solvent and subsequent to the recovery of the polymers, they were each hydrogenated utilizing a nickel/aluminum catalyst to give a product wherein 2% of the original unsaturation in the polymerized isoprene remains and no more than 5% of the original unsaturation of the styrene is removed.

The PPE utilized was a product sold under the trade designation PPO 806 by GE Plastics. The PPE and each of the block copolymers was melt blended on a 25 mm co-rotating twin screw extruder at 300° C. and a screw speed of 300 RPM. All of the ingredients, including antioxidant, were dry tumble blended together prior to addition to the twin screw extruder. The blend extrudates were collected as pellets. The resulting blends were molded into test specimens on a 25 ton injection molding machine. The results of the analysis of these test specimens is shown herein below in Table 1.

TABLE 1

| | AB,[1] MW | AB,[2] | Impact,[3] ft-lb/in | Flex Mod (Mpsi) | Visual Clarity | Luminous[4] Transmittance | Clarity[5] (Haze) |
|---|---|---|---|---|---|---|---|
| 1 | — | 0 | 1.0 | 381 | Yes | 56.0 | 23.5 |
| 2 | 28—100[7] | 17.0 | 9.7 | 276 | No | 0.5 | 0.0 |
| 3 | 100—100 | 10.6 | 2.0 | 348 | Yes | 14.0 | 1.4 |
| 4 | 100—100 | 25.8 | 2.2 | 316 | No | 2.9 | 0.1 |
| 5 | 40—40 | 10.6 | 2.2 | 349 | Yes | 36.5 | 10.6 |
| 6 | 40—40 | 25.8 | 2.3 | 324 | Yes | 26.4 | 4.1 |
| 7 | 6—6 | 18.2 | —[6] | —[6] | No | —[6] | —[6] |

[1]Selectively hydrogenated styrene-isoprene block copolymer to give styrene-ethylene/propylene AB polymer. MW shown in thousands ("Peak" MW).
[2]Weight percent block copolymer based on total weight of block copolymer/PPE blend.
[3]Notched Izod run on ⅛-inch specimens at room temperature.
[4]ASTM D1003
[5]ASTM D1003
[6]Not run because blend extrudate was too low viscosity to pelletize and delaminated upon cooling.
[7]22 wt. percent styrene.

As shown by Run 1, the neat PPE has excellent clarity but low impact strength. As shown by Run 2, a block copolymer having only 22 weight percent styrene improves the impact strength but destroys clarity. As shown by Runs 3–5, clarity is improved compared with Run 2 if the percentage polymerized styrene content is greater. Run 4 with the same block copolymer as Run 3 at a higher level shows that 200,000 total molecular weight is close to the upper acceptable limit for total molecular weight with an AB polymer. As can be seen by comparing Run 4 with Run 6, the poor clarity in Run 4 is the result of the total molecular weight being almost too high, not the 50—50 weight ratio of resinous to rubbery component. Run 7 shows that 12,000 total molecular weight is too low because at this molecular weight clarity is destroyed. Finally, Run 7 shows that the absolute size of the styrene block as well as the percent styrene is important since Run 7 had 50% styrene but gave unacceptable results.

While this invention has been described in detail for the purpose of illustration, it is not to be construed as limited thereby but is intended to cover all changes and modifications within the spirit and scope thereof.

What is claimed is:

1. A clear composition comprising:

a polyphenylene ether; and a hydrogenated AB block copolymer having a terminal resinous block derived from styrene or a-methylstyrene and a rubbery block derived from a 4–8 carbon atom conjugated alkadiene, said resinous block having a molecular weight within the range of 23,000–100,000, the total resinous component content of said block copolymer being within the range of 45–58 weight percent;

wherein the total molecular weight of said block copolymer is within the range of 40,000–225,000, said block copolymer being present in an amount within the range of 2–30 weight percent based on the weight of said polyphenylene ether and said block copolymer;

wherein said block copolymer is hydrogenated to the extent that unsaturation is said rubbery block is reduced to less than 10% of the original unsaturation; and wherein no more than 10% of the original aromatic unsaturation of said resinous block is removed.

2. A composition according to claim 1 wherein said conjugated alkadiene is selected from the group consisting of isoprene and butadiene and said block copolymer is present in an amount within the range of 5–25 weight percent.

3. A composition according to claim 1 wherein said resinous block has a molecular weight within the range of 40,000–80,000, said total molecular weight of said block copolymer is within the range of 60,000–160,000, and wherein said block copolymer is present in an amount within the range of 10–25 weight percent based on the weight of said polyphenylene ether and said block copolymer.

4. A composition according to claim 1 wherein said polyphenylene ether is poly(2,6-dimethyl-1,4-phenylene) ether.

5. A composition according to claim 1 comprising in addition a stabilizer.

6. A composition according to claim 5 wherein said stabilizer is tetrakis (methylene(3,5-di-t-butyl-4-hydroxyhydrocinnamate)) methane.

7. A clear composition comprising:

a polyphenylene ether;

a hydrogenated AB block copolymer having a terminal resinous block derived from styrene or a-methylstyrene and a rubbery block derived from a 4–8 carbon atom conjugated alkadiene, said resinous block having a molecular weight within the range of 23,000–100,000, the total resinous component content of said block copolymer being within the range of 45–58 weight percent wherein the total molecular weight of said block copolymer is within the range of 40,000–225,000, said block copolymer being present in an amount within the range of 2–30 weight percent based on the weight of said polyphenylene ether and said block copolymer; and a stabilizer.

8. A composition comprising:

a polyphenylene ether of the formula

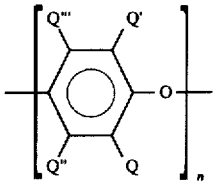

wherein Q, Q', Q'' and Q''', are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, and Q', Q'' and Q''' in addition may be halogen with the proviso that if Q', Q'' or Q''' are halogen Q and Q' are preferably free of tertiary carbon atoms; and n represents the total number of monomer residues and is an integer of at least 50;

a block copolymer having the general configuration of AB wherein A is a polymerized styrene block and B is an ethylene/propylene block derived from hydrogenation of polymerized isoprene; and a stabilizer;

wherein said polymerized styrene block has a molecular weight within the range of 23,000–100,000 and constitutes 45–58 weight percent of said block copolymer, wherein said block copolymer has a molecular weight within the range of 40,000–225,000 and wherein said block copolymer is present in said composition in an amount within the range of 2–30 weight percent based on the weight of said polyphenylene ether and said block copolymer.

9. A composition according to claim 8 comprising an addition of stabilizer.

10. A composition according to claim 9 wherein said stabilizer is tetrakis-(methylene(3,5-di-t-butyl-4-hydroxyhydrocinnamate)) methane.

11. A composition according to claim 10 wherein said hydrogenated polymerized isoprene contains less than 10% of the original unsaturation in the unhydrogenated polymerized isoprene and wherein greater than 90% of the polymerized styrene aromatic unsaturation remains.

12. A composition according to claim 10 wherein said polymerized styrene block has a molecular weight within the range of 40,000–80,000, said molecular weight of said block copolymer is within the range of 60,000–160,000 and wherein said block copolymer is present in an amount within the range of 10–25 weight percent based on the weight of said polyphenylene ether and said block copolymer and wherein said polyphenylene ether is poly(2,6-dimethyl-1,4-phenylene)ether.

13. A composition according to claim 12 wherein said ethylene/propylene block has a molecular weight of less than 150,000.

14. A composition according to claim 8 comprising in addition an amount of polystyrene sufficient to improve processability but less than 10 weight percent.

15. A composition according to claim 8 comprising in addition 2 to 5 weight percent polystyrene based on total weight of said composition.

* * * * *